July 21, 1953  E. G. BENNETT ET AL  2,645,835
VERTICAL EXTRUSION MACHINE
Filed March 25, 1949  11 Sheets-Sheet 1

FIG.1.

Inventors
Edgar Carford Bennett
Charles Leslie Willis
By
Agent.

July 21, 1953  E. G. BENNETT ET AL  2,645,835
VERTICAL EXTRUSION MACHINE

Filed March 25, 1949  11 Sheets-Sheet 2

FIG2.

Inventors
Edgar Earford Bennett
Charles Leslie Willis
By
Agent

July 21, 1953 E. G. BENNETT ET AL 2,645,835
VERTICAL EXTRUSION MACHINE
Filed March 25, 1949 11 Sheets-Sheet 5

FIG.5.

Inventors
Edgar Garford Bennett
Charles Leslie Willis
By
Agent.

FIG.6.

July 21, 1953 E. G. BENNETT ET AL 2,645,835
VERTICAL EXTRUSION MACHINE
Filed March 25, 1949 11 Sheets-Sheet 7

FIG. 7.

Inventors
Edgar Garford Bennett
Charles Leslie Willis
By
Agent.

July 21, 1953  E. G. BENNETT ET AL  2,645,835
VERTICAL EXTRUSION MACHINE
Filed March 25, 1949  11 Sheets-Sheet 9

FIG. 9.

Inventors
Edgar Banford Bennett
Charles Leslie Willis
By
James W. Payton
Agent.

July 21, 1953  E. G. BENNETT ET AL  2,645,835
VERTICAL EXTRUSION MACHINE
Filed March 25, 1949  11 Sheets-Sheet 11

Inventors
Edgar Barford Bennett
Charles Leslie Willis
By
Agent.

Patented July 21, 1953

2,645,835

UNITED STATES PATENT OFFICE 2,645,835

VERTICAL EXTRUSION MACHINE

Edgar Garford Bennett, Woodville, and Charles Leslie Willis, Ashby-de-la-Zouch, England Application March 25, 1949, Serial No. 83,446
In Great Britain August 22, 1947

10 Claims. (Cl. 25—11)

This invention relates to vertical extrusion machines for making articles from plastic material such as clay.

The object of the invention is to provide a machine in which the drive to the extrusion means will be automatically initiated at the appropriate time intervals and automatically disconnected, and also to arrange such actuation of the drive to synchronise with the appropriate positions of the work-table.

Another object is to release the work-table automatically after having locked it while extrusion proceeds, and thereafter to allow the table to descend under the pressure of the material being extruded.

Another object is to stop the extrusion of the material automatically after the table has descended a suitable distance.

Another object is to provide automatically operated means for cutting off the extruded article at the extrusion die.

Another object is to provide more easy means of removing the extruded article from the work-table.

Another object is to return the table automatically after the extruded article has been removed from it.

Another object is to provide a machine in which the whole of the operations connected with the extrusion of the material and the movements of the work-table are effected mechanically.

Another object is to effect the movements referred to in the preceding paragraph automatically in a continuously recurring cycle in the correct sequence and at the appropriate time-intervals.

A constructional form of the invention will now be described with reference to the accompanying drawings, in which:

Figure 10 is a sectional elevation and Figure 11 a plan showing the die and associated mechanism for cutting off the extruded article.

Figure 12 is a side elevation, Figure 13 a part sectional elevation, and Figure 14 a plan of the work-table of the machine and associated parts.

Figure 1:
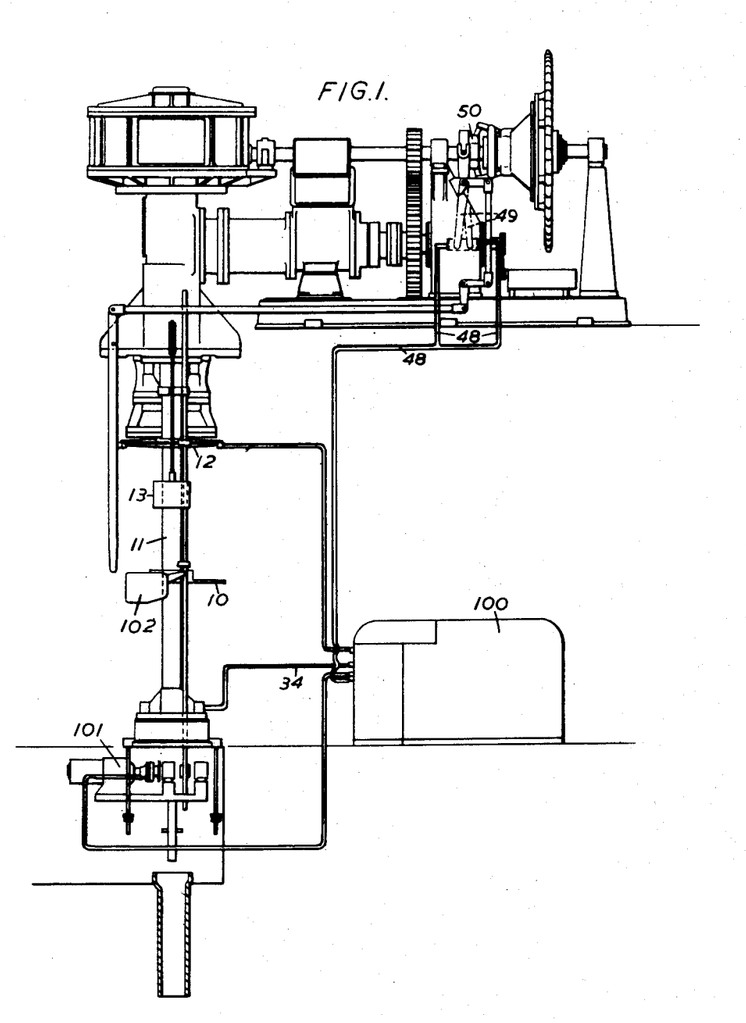
Figures 1 and 2 are respectively side and front elevations, drawn to a smaller scale than the other views, showing the general arrangement and disposition of parts in a vertical extrusion machine for making pipes with an enlarged socket end.
Figure 2:
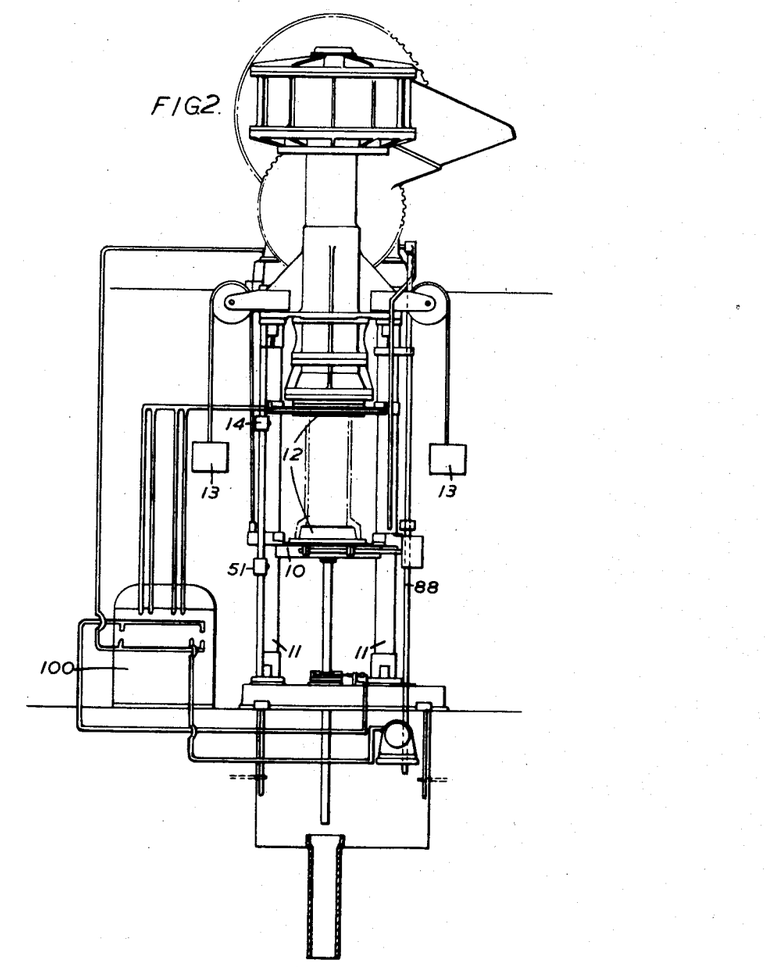
Figure 3:
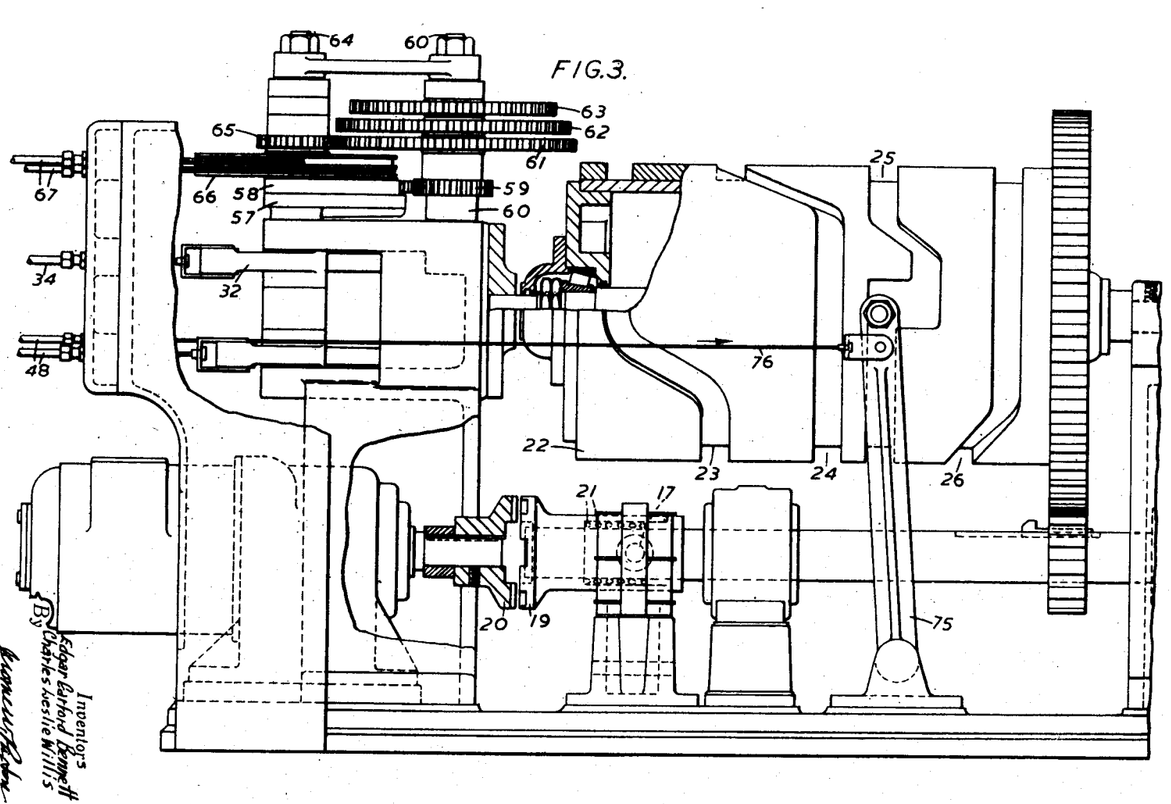
Figure 3 is a part sectional elevation of mechanical control means.
Figure 4:
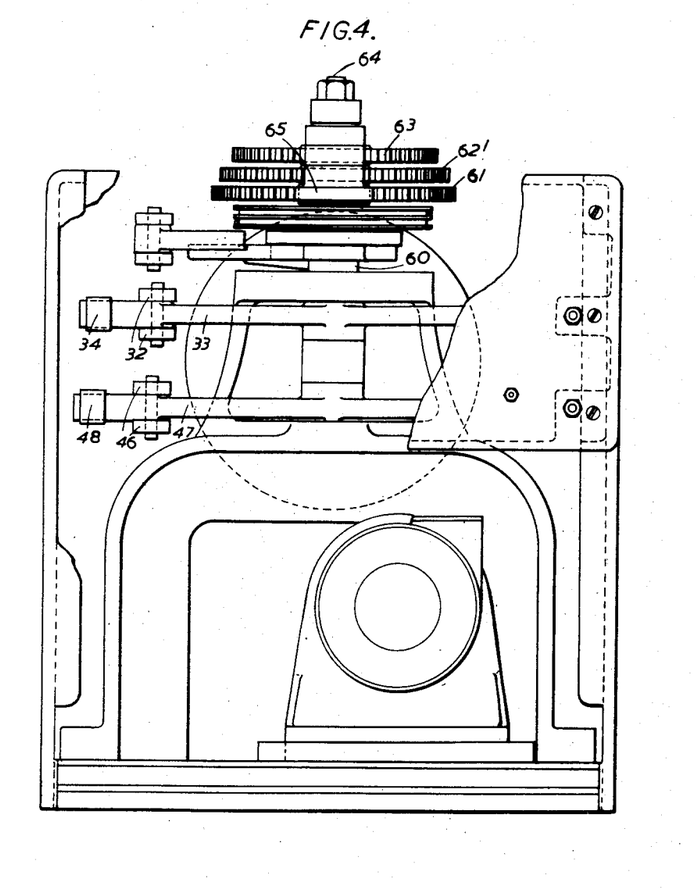
Figures 4 and 5 are opposite end views of this part of the apparatus.
Figure 5:
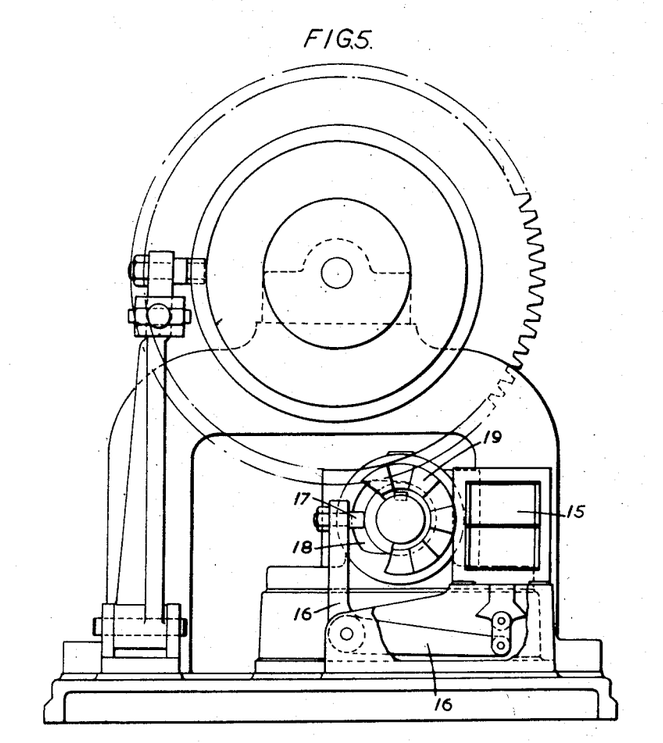
Figure 6:
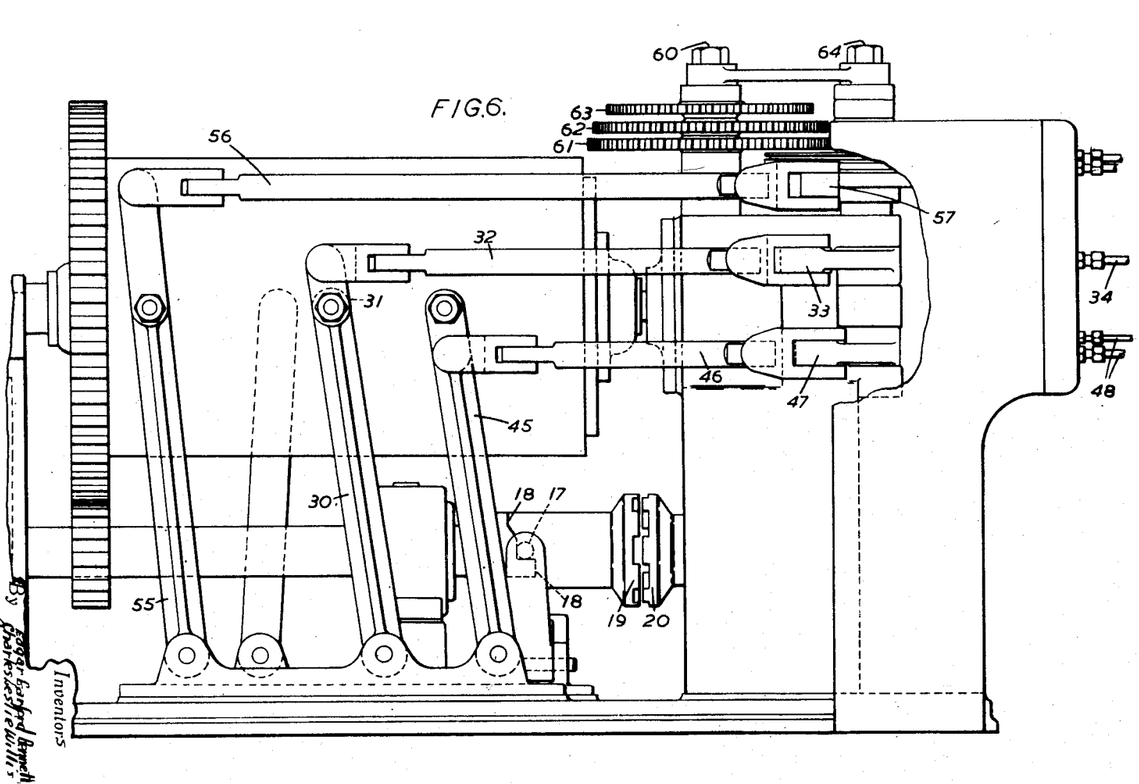
Figure 6 is an elevation showing especially the associated lever mechanism and Figure 7 is a plan.
Figure 7:
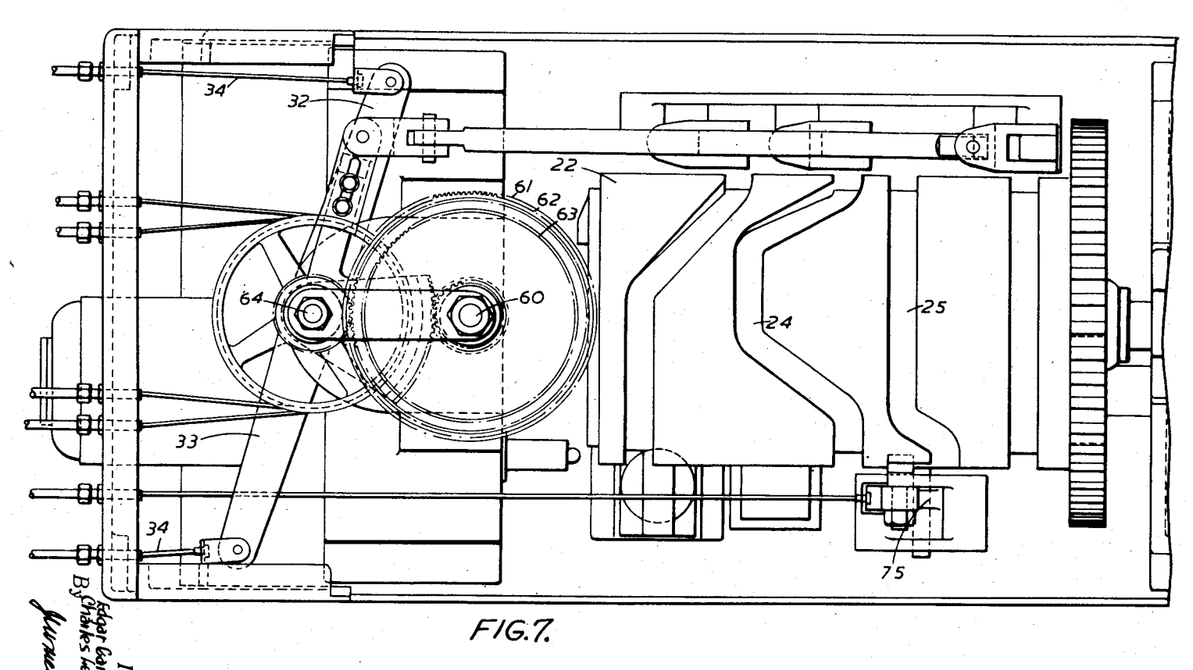

The machine illustrated generally in Figures 1 and 2 follows in the main known lines of a pipe machine. The pipes are extruded on to a vertically sliding work-table 10, the table being mounted on columns 11, down which it is forced by the pressure of the material being extruded through the die 12. The return movement of the table is made under the action of the usual counter-weights 13.

Figure 8:
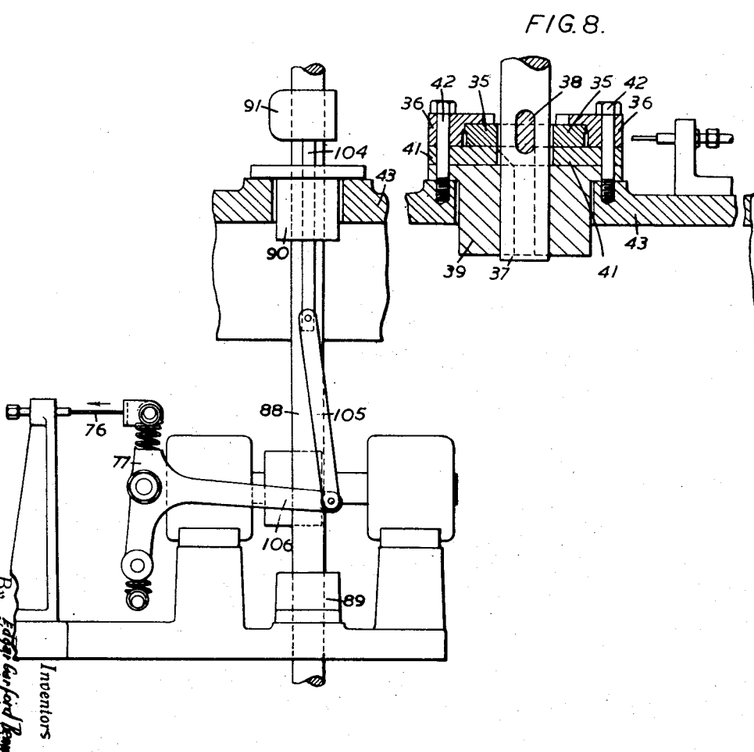
Figure 8 is a sectional elevation and Figure 9 a plan showing the base plate of the machine and associated parts.
Figure 9:
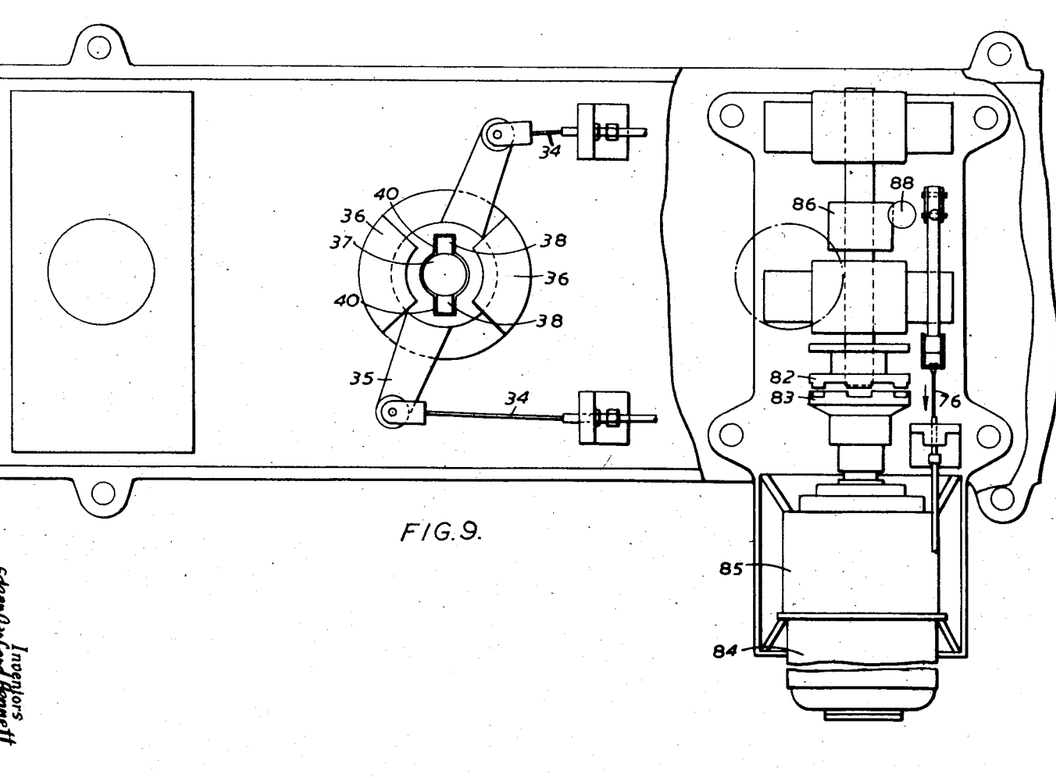
Figures 10, 11:
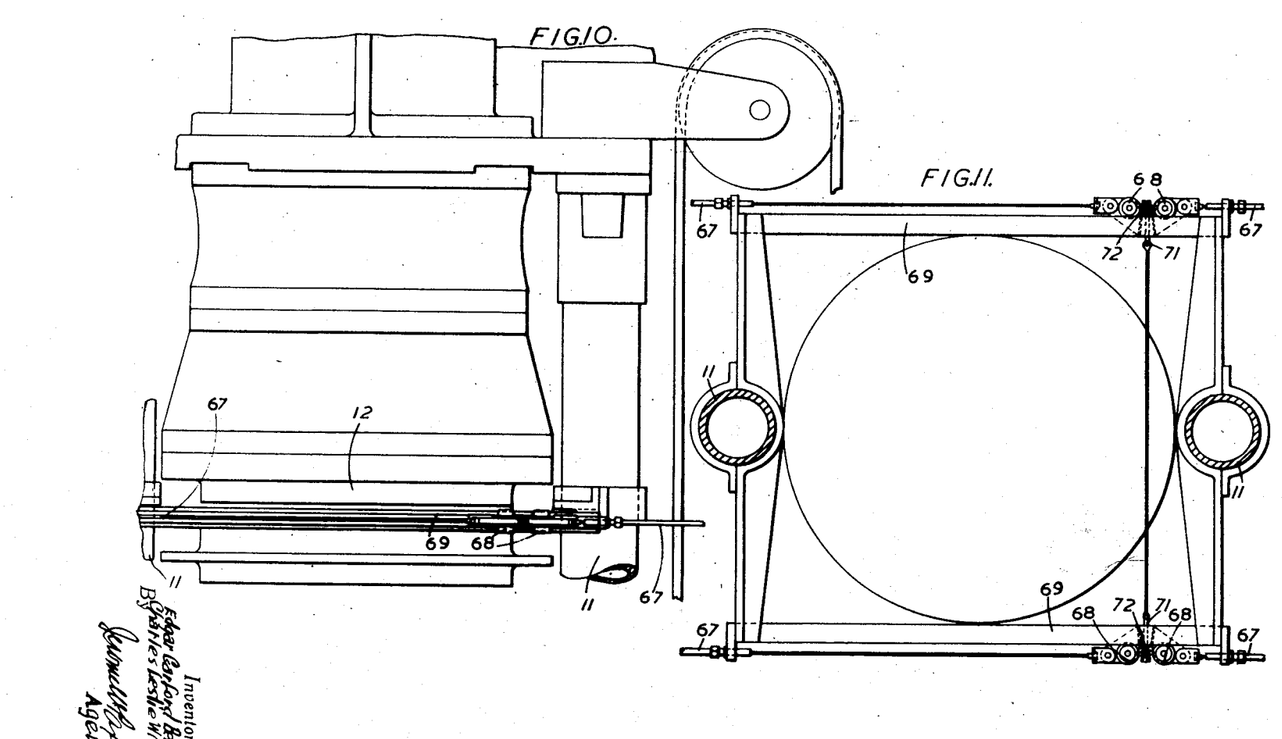
Figures 12, 13:
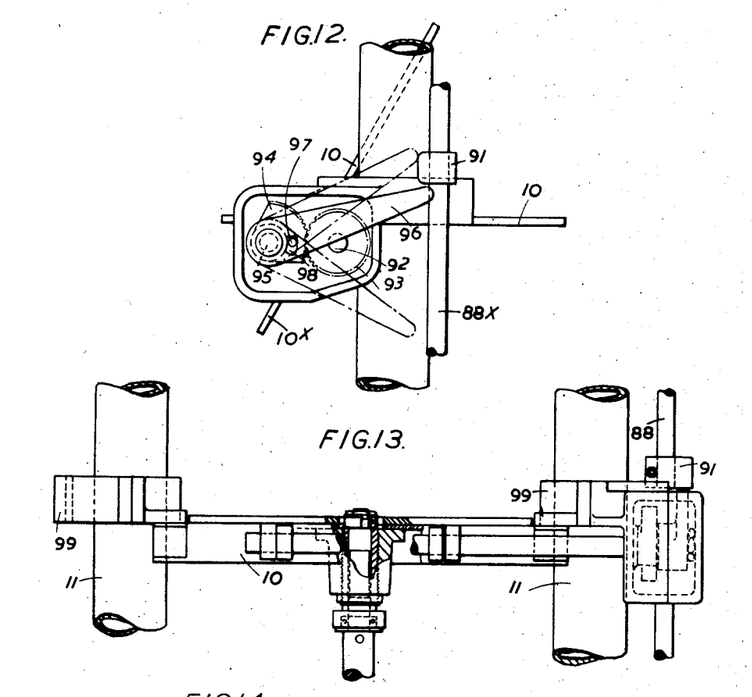
Figure 14:
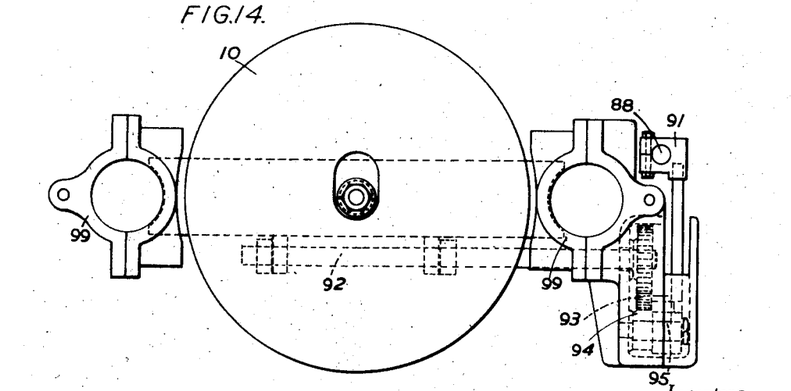

The casing of the operations control gear is shown at 100, and this mechanism is shown in Figures 3 to 7. The casing of mechanism for locking and lowering the table is shown at 101, and this mechanism is shown in Figures 8–9. The casing of table tilting gear is shown at 102, and this mechanism is shown in Figures 12 to 14.

As the table arrives in its top position at the conclusion of its return movement under the action of the weights 13, it operates a limit switch 14 which initiates an electrical delay timing device, adjustable by means of a small hand control knob not shown in the drawings, which can be set to give the required delay to form the socket of the article. The limit switch 14 also energises through a contactor a main control solenoid 15 which by means of a bell crank lever 16 and plunger 17 operates a cam 18 forming part of one half 19 of a dog clutch 19, 20, spring-loaded at 21. The contactor is designed to break the solenoid circuit before the dog clutch 19, 20 has made one revolution, irrespective of the time during which the limit switch is in the "on" position. This ensures that the plunger 17 returns to its original position in time for the cam 18 acting against the plunger to withdraw the part 19 of the dog clutch from engagement. The cam is shaped to prevent the part 19 from over-running beyond one complete revolution. The part 20 is driven continuously at constant speed. This clutch 19, 20 is geared with the main mechanical control device, which is in the form of a drum 22 having a series of cam grooves 23, 24, 25, 26 round its barrel. The ratio of the gearing between the clutch and the drum is governed by the number of movements in the cycle. In the example being described relating to a pipe machine, there are four movements, and the gear ratio is 4 to 1; in other words, each time the solenoid causes the member 19 to make one complete revolution, the clutch causes the drum 22 to make one quarter of a revolution. This first movement of the cam drum 22 operates the table locking mechanism through the medium of a lever 30 with roller 31 operating in the cam groove 24. The lever 30 is pivoted to a rod 32 connected to a rocking lever 33 to both ends of which a cable 34 is attached, the other ends of the cables being attached to a locking lever 35 held in position in a rotatable manner between segments 36. The table spindle 37 at the top of which the table 10 is carried has a locking key 38 passed through it near the lower end; the spindle 37 is positioned and allowed to slide through the bearing bush 39 which has two slots 40 to allow the key to pass through. Immediately above the bush 39 a face cam 41 is fixed by means of pins 42 screwed into the base plate 43. When the height of the table is adjusted to allow the correct relation between the key and the cam 41 with the table in the top position, partial rotation of the locking lever 35 will engage the key 38, rotate the spindle 37 and cause the key to mount the face of the cam 41, so locking the table in the top position. This first movement of the cam drum 22 also actuates the machine clutch in a similar way, by means of a lever 45 and roller engaging in the cam groove 23. The lever 45 actuates a rod 46, rocking lever 47, and cables 48, the other ends of the cables being fastened to the lever 49 which operates the main driving clutch 50 of the extrusion worm. As soon as the machine clutch 50 has been actuated extrusion commences and the closed die 12 is pressed full of material. The delay governed by the adjustable electrical timer for forming the socket having taken place (and it is very desirable that the timer shall be easily adjusted because the amount of this delay may easily vary from day to day under different working conditions, as well as due to different sizes of articles being extruded) the solenoid 15 is again energised, operating the cam drum 22 a further quarter revolution through its clutch 19, 20. This brings into action the releasing mechanism for the table by the reverse action of the cables on the locking lever 35 so that the table 10 is thereby unlocked and begins to descend under the pressure of the material being extruded, and in doing so the first-mentioned limit switch 14 is released and the timer is de-energised. The table continues to descend until it operates another limit switch 51 suitably placed in an adjustable manner to govern the length of extruded article. This limit switch 51 energises another contactor which re-energises the main solenoid 15 causing the cam drum 22 to make a further quarter revolution. Here again the electrical means is employed to break the solenoid contactor circuit in time to allow the plunger 17 to return to its original position before the dog clutch 19, 20 has made one complete revolution, and to ensure that the plunger 17 returns to its original position in time for the cam 18 acting against the plunger to withdraw the part 19 of the dog clutch from engagement. This movement of the drum 22 operates the mechanism for disengaging the machine clutch 50, by which extrusion is stopped. The last phase of this part of the movement of the drum 22 also operates another limit switch, which immediately re-energises the main solenoid through contactors and electrical timing means as before, and so effects a further one quarter revolution of the cam drum 22. This brings into action the lever 55, rod 56 and rocking member 57 controlled by the cam groove 26 to operate the cutting off device causing it to move across the material being extruded and back again to its original position. This is achieved by means of a toothed segment 58 carried by the rocking member 57, which engages with a pinion 59 keyed on a shaft 60, the shaft carrying gear wheels 61, 62, 63, any of which can be used to drive another shaft 64 by gear wheels one of which is seen at 65. Fixed on to the shaft 64 is a grooved cable drum 66 to which cables 67 are anchored. The cables are attached to wheeled carriers 68 running on rails 69 suitably fixed horizontally beneath the die 12. The cutting off device is in the form of a wire 70 strained across the carriages 68 on screwed hooks 71 fitted with tension springs 72. The position of the cutting-off device is necessarily adjustable, preferably on the machine columns 11. The last phase of this movement of the drum 22 acts to engage a lever 75 in the groove 25, which pulls the cable 76 in the direction of the arrow. The cable operates a lever 77 and yoke 78 pivoted at 79. The yoke carries rollers 80 which engage a groove 81 in the sliding member 82 of another dog clutch 82, 83, the part 83 being driven at constant speed, preferably by a motor 84 and reduction gear 85. The part 82 is fitted on the shaft 87 on a sliding key to which also is fitted a pinion 86. Engagement of the dog clutch will therefore cause the pinion 86 to rotate. The pinion 86 is in mesh with a toothed rack either cut in or fitted to the vertical shaft 88 which is supported vertically in bearings 89, 90 fixed in the base plate 43. The shaft 88 is free to slide vertically. Above the base plate an adjustable collar 91 is fastened on the shaft 88. The table 10 is pivoted on a horizontal axis by being keyed on to a hinge pin 92 to which a pinion 93 is fixed. The pinion 93 is engaged by a gear segment 94 which is free to rotate on a pin 95. Also free to rotate on the pin 95 is an arm 96 which is arranged to be contacted by the collar 91 on the shaft 88. A peg 97 is formed on the segment 94 engaging in a larger slot 98 in the arm 96. The table 10 with this associated mechanism is forced down by the action of the extrusion and the collar 91 on the shaft 88 is fixed on the shaft in such a position that when the limit switch 51 is operated to stop the extrusion, the arm 96 has just passed the collar 91 as shown in firm lines; the shaft 88 remaining in its uppermost position during this downward motion of the table. The slot 98 is cut in the arm 96 to allow the arm to pass the collar 91 without rotation of the gear segment 94. At this stage in the machine cycle the dog clutch 82 causes the pinion 86 to revolve as already described, and the rack on the shaft 88 draws the shaft down, causing the collar 91 to press on the arm 96 causing the table to move downwards further until one of the table bearing caps 99 engages with an adjustable stop (not shown) on one of the columns 11 to arrest the downward movement of the table and thereby regulate the position at which the tilting movement of the table commences. The continued downward movement of the shaft 88 and collar 91 causes the pinion 93 to be rotated by the arm 96 and segment 94. This causes the table hinge pin 92 to be rotated by the gear 93 which will cause the table 10 to tilt the required amount depending upon the length of the arm 96 and the downward travel of the shaft 88. As the table moves downwards one of the table bearing caps 99 engages with an adjustable stop (not shown) on one of the columns 11 to regulate the position at which the tilting movement of the table commences. The downward movement of the collar 91 causes it eventually to contact the vertical plunger 104 which operates links 105, 106 to operate the lever 77 and yoke 78 to disengage the dog clutch 82, 83. This will cause the cable 76 to return the lever 75 to its original position in the cam groove 25. The cam groove is cut as shown to allow this to take place. When the extruded article is removed and the dog clutch 82, 83 is disengaged the table 10 is able first to re-assume its horizontal position and then to rise under the action of its counterweights 13 to the top position, where the limit switch 14 is contacted and the cycle of operations begins again. During the upward travel of the table 10 the rod 88 will also be returned upwardly and in its top position its upper end or an abutment carried by it may be arranged to actuate an atomiser or spray gun which injects lubricant into the die immediately before the die closes. This injection into the die is through flexible pipes and nozzles fitted into the die itself.

The machine which has been described is fully automatic, that is to say the various operations are performed in a continuously recurring cycle without manual intervention except for lifting off the extruded articles from the work-table 10 at the appropriate moments. Provision may be made by means of a switch to cut out this fully automatic operation and enable all the operations to be initiated by pressing a button switch or the like. Thus the button switch would initiate each operation in the cycle, but the control system would ensure that the operations were performed in the correct sequence. The button switch would be used to operate electrical contactors and timing devices which govern the length of time the solenoid 15 is energized at each operation of the button, irrespective of the length of time the button is operated or depressed. This ensures that the dog clutch 18, 19 only makes one complete revolution at each depression of the button or the like.

Although the invention has been described more particularly in connection with a pipe machine it will be understood that vertical extrusion machines are used to make other articles such as conduits, bends, hollow blocks and the like.

The electrical contactor and delay timing system has not been described, because apparatus of this nature is already used to initiate mechanical devices at pre-determined time intervals, and apparatus convenient for the purposes of this invention is therefore available commercially at the present time. It may be said that such delay switching apparatus may consist of a condenser-resistance circuit in which the contactor is held by the charge given to a condenser, the duration of the charge being controlled by a pre-set or adjustable resistance. One such delay-switching apparatus is known as the "B. T. H. Electronic Timer."

The invention provides an extrusion machine in which the usual operation by hand-levers or the like is replaced by automatic operation. Hitherto the operation of these machines has been extremely laborious and fatiguing. Not only is the work heavy, but it has to be done quickly and there is only room for one man as a rule to work all the various controls.

Having now described our invention, what we claim as new and desire to secure by Letters Patent is:

1. A vertical extrusion machine for making articles from plastic material comprising a die, a work table pivotally movable about a horizontal axis mounted for vertical sliding movement relative to the die, cam means operatively connected with said work table and die to lock the table in a raised position and fill the die with plastic material, further cam means to unlock the table whereby the table descends under the pressure of the material being extruded, and additional cam mans to inactivate the die when the table has descended a predetermined distance to permit the extruded article to be cut off, and further cam means to move the table about its pivot to facilitate removal of the article.

2. A vertical extrusion machine as claimed in claim 1 wherein a further cam means actuates a cut-off device to move beneath the die to cut off the extruded article after the die has been inactivated.

3. A vertical extrusion machine as claimed in claim 1 wherein a horizontally movable carrier is disposed beneath the die, a cut-off wire on said carrier, and cam means operatively connected with the carrier to move said carrier beneath the die whereby the wire will cut off the extruded article after the die has been inactivated.

4. A vertical extrusion machine for making articles from plastic material comprising a die, a work table mounted for vertical sliding movement relative to the die, means for feeding plastic material to the die, a clutch for controlling said feeding means, a rotatable drum having a plurality of cam ways therein, clutch means to impart limited rotary movement to said drum, a solenoid to actuate said clutch at predetermined time intervals, switch means operated by the table to energize and de-energize the solenoid, a lever disposed in one of said cam ways and moved by the rotation of said drum, a locking unit carried by said table, a connection between said lever and said locking unit, and a second lever movable in another of said cam ways and operatively connected with said material feeding clutch, the arrangement being such that energization of the solenoid operates the clutch means whereby the drum partially rotates, thus causing said first mentioned lever to actuate the table locking unit to lock the table and cause said second mentioned lever to actuate the material feeding means to fillthe die, thereafter the drum is again partially rotated so that the first mentioned lever releases the table locking unit to permit the descent thereof under the pressure of the material being extruded from the die, the table operating one of said switches after a predetermined descent to energize said solenoid to further turn the drum whereby said material feeding clutch is disengaged to arrest extrusion of the material from the die.

5. A vertical extrusion machine as claimed in claim 4 wherein a longitudinally movable cut-off member is disposed beneath said die, a further lever is movable in another of said drum cam ways, and a drive connection between said lever and movable cut-off member so that further rotation of said drum moves the carrier to cut off the extruded article.

6. A vertical extrusion machine as claimed in claim 4 wherein said cam means are controlled by a clutching device and a solenoid actuated by strategically located switches in the path of movement of the work table controls said clutch to operate said cam means.

7. A vertical extrusion machine for making articles from plastic material comprising extruding means, means to introduce the plastic material into the extruding means, a clutch for controlling the operation of the material introducing means, a work table pivotally movable about a horizontal axis mounted for vertical sliding movement relative to the extruding means, a locking unit for locking the work table in a raised position, automatically operated means to actuate said locking unit to lock said table and to activate said clutch for introducing the plastic material into the extruding means, further automatically actuated means to operate said locking unit to unlock the table whereby the table descends under the pressure of the material being extruded, additional automatic means actuated after the table has descended a predetermined distance to inactivate the said clutch, thus arresting operation of the extruding means to permit the extruded article to be cut off, and further automatic means actuated after the article has been cut off to move the table about its pivot to facilitate removal of the article.

8. A vertical extrusion machine for making articles from plastic material comprising extruding means, a work table pivotally movable about a horizontal axis mounted for vertical sliding movement relative to the extruding means, automatically actuated means to lock the work table in a raised position and fill the extruding means with plastic material, further automatically actuated means to release the table whereby the table descends under the pressure of the material being extruded, additional means actuated after the table has descended a predetermined distance to arrest operation of the extruding means to permit the extruded article to be cut off, and additional means automatically actuated after the extruded article has been cut off to move the table about its pivot to facilitate removal of the article.

9. A vertical extrusion machine as claimed in claim 8 wherein means is provided to automatically cut off the extruded article.

10. A vertical extrusion machine as claimed in claim 8 wherein further means is provided to automatically move the table upwardly about its pivot.

EDGAR GARFORD BENNETT.
CHARLES LESLIE WILLIS.

References Cited in the file of this patent

UNITED STATES PATENTS

| Number | Name | Date |
| --- | --- | --- |
| 1,558,030 | Martin | Oct. 20, 1925 |
| 1,651,203 | Hibbins | Nov. 29, 1927 |
| 1,808,964 | McClintock et al. | June 9, 1931 |
| 1,899,115 | Schultz | Feb. 28, 1933 |
| 1,925,050 | Jagdmann et al. | Aug. 29, 1933 |
| 1,978,420 | Dyer | Oct. 30, 1934 |
| 2,451,713 | Brown et al. | Oct. 19, 1948 |
| 2,480,442 | Booth | Aug. 30, 1949 |